May 23, 1950  W. J. FIELD  2,508,639
ELECTRICAL MOTOR CONTROL APPARATUS WITH MEANS
FOR REDUCING MOTOR SPEED TO PREVENT COASTING
Filed Dec. 30, 1943  3 Sheets-Sheet 1

Inventor
WILLIAM J. FIELD
By
George H. Fisher
Attorney

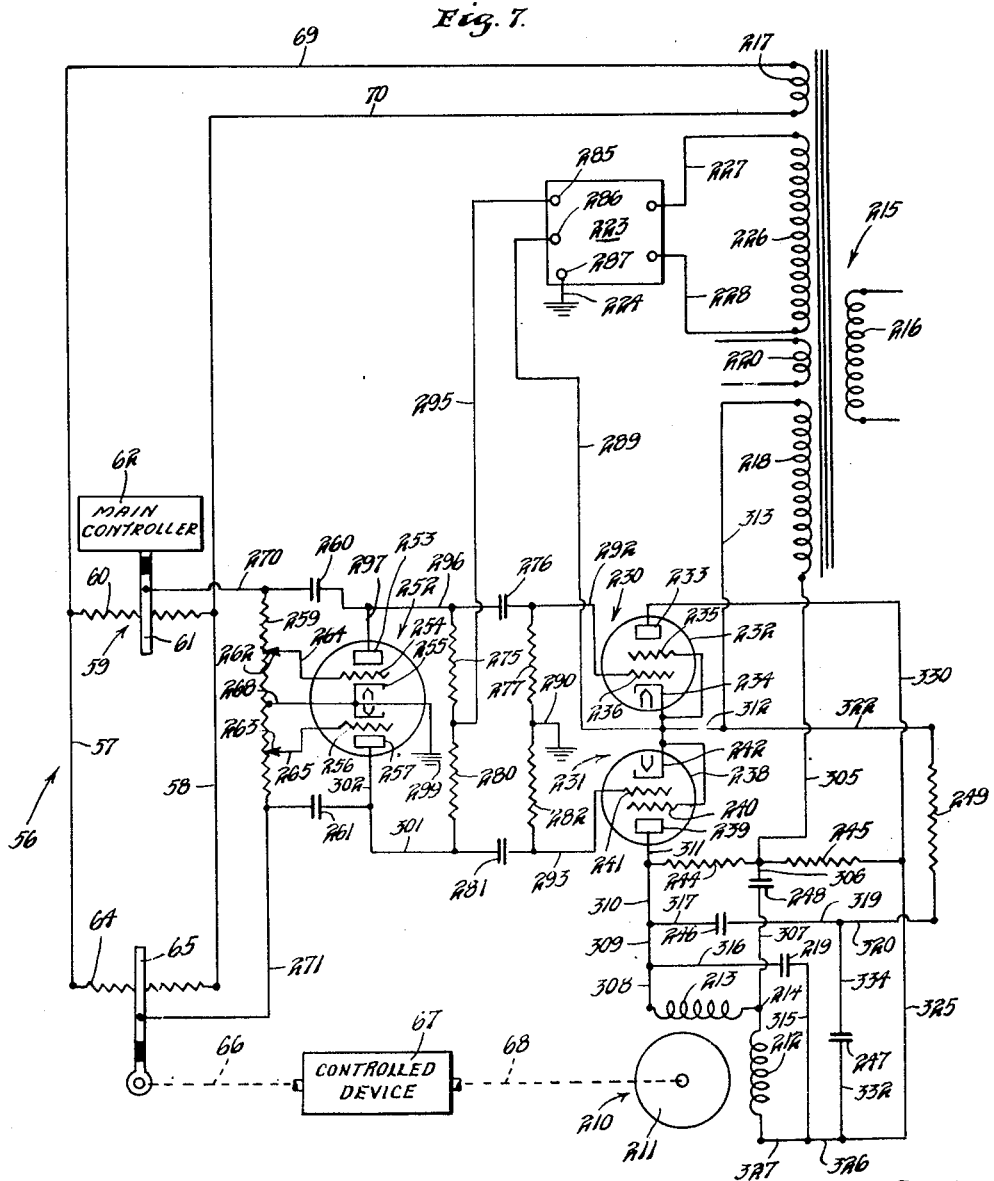

Patented May 23, 1950

2,508,639

UNITED STATES PATENT OFFICE 2,508,639

ELECTRICAL MOTOR CONTROL APPARATUS WITH MEANS FOR REDUCING MOTOR SPEED TO PREVENT COASTING

William J. Field, Minneapolis, Minn., assignor to Minneapolis-Honeywell Regulator Company, Minneapolis, Minn., a corporation of Delaware Application December 30, 1943, Serial No. 516,237

14 Claims. (Cl. 318—29)

The present invention is concerned with a motor control system and more particularly with one in which provision is made for quickly terminating operation of the motor.

It is quite customary in certain motor control systems to control the energization of a motor in accordance with the value of a controlling condition. The motor is often used in such systems to position a condition controlling device and if the regulation of the condition is to be maintained as accurately as possible, it is desirable that the operation of the motor terminate quickly when the value of the condition is such as to no longer call for motor operation. Accordingly, various arrangements have been devised for quickly terminating the operation of the motor upon the value of the controlling condition being such that motor operation is no longer desired. In some cases, such braking arrangements have been in the form of mechanical brakes whether constantly applied or applied at the time of stopping of the motor. In other cases, auxiliary electrical windings have been employed for braking purposes.

It is an object of the present invention to provide means for braking an alternating current motor without the use of auxiliary windings or mechanical devices. In general, this is accomplished by supplying direct current to one or more of the windings of the motor.

A further object of the present invention is to provide an alternating current motor control system in which the braking is accomplished by rectifying an alternating voltage applied to one of the windings so that the current flowing through the winding has a direct current component.

A still further object of the present invention is to provide such an arrangement in which the rectifier is connected in parallel with a constantly energized winding, the rectifier being ineffective except when it is desired to terminate operation of the motor.

A further object of the invention is to provide such a braking arrangement in which the braking means is controlled by an electronic device which has voltages applied thereto dependent upon both the value of the controlling voltage and the speed of operation of the motor.

An alternative object of the present invention is to provide an arrangement such as described in which the rectifier is connected in parallel with a winding whose energization is normally variably controlled.

A further object of the invention is to provide a motor control system in which a motor is energized by a cyclically varying voltage having a unidirectional component and in which means is provided for continuously applying to the motor a unidirectional component of such polarity and magnitude as to cause the wave form of the cyclically varying voltage to approach the wave form of an alternating voltage, the unidirectional voltage being effective when the cyclically varying voltage is substantially removed to cause a braking effect.

A still further object of the invention is to provide a control system for an alternating current motor in which the direct current for braking purposes is derived from a condenser associated with the motor winding.

A still further object of the invention is to provide generally a control system for controlling the energization of an alternating current operated device in which the energization of the device is controlled by an electronic rectifier and in which a unidirectional voltage is applied to the device to cause the wave form of the resulting voltage to approximate more nearly that of an alternating voltage.

A still further object of the present invention is to provide a control means for an alternating current operated device in which the alternating current operated device is energized under the control of an electronic rectifier and in which an alternating current shunt is established around the electronic rectifier so that a component of alternating current is superimposed on the rectifying current supplied to the device to cause the wave form of the resultant current to approximate more nearly that of an alternating current.

Other objects of the present invention will be apparent from a consideration of the accompanying specification, claims, and drawings, of which:

Figure 3:
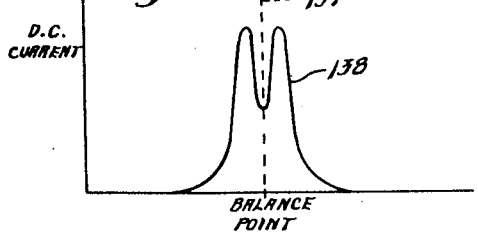
Figure 4:
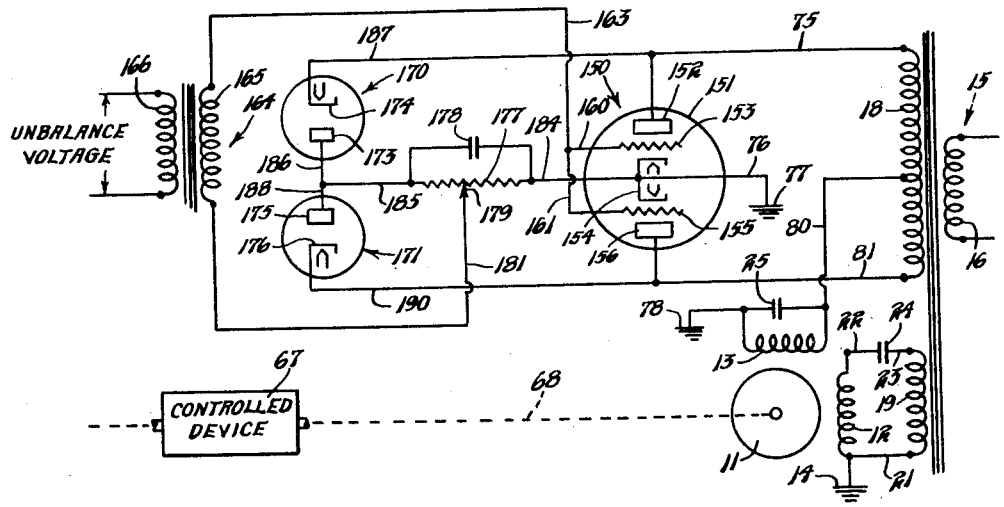
Figure 5:
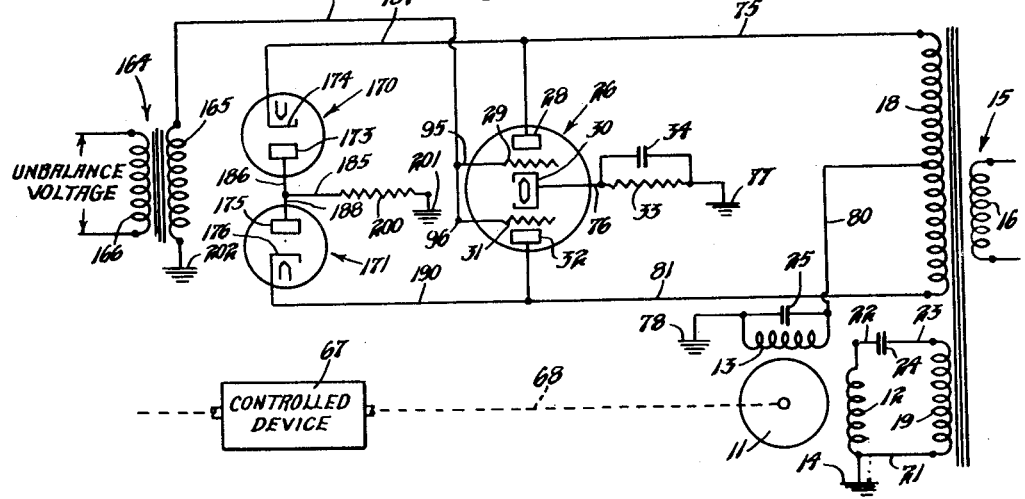
Figure 6:
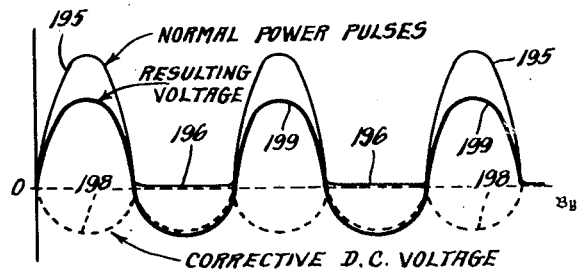

Figure 3 is a diagram indicating the increase in direct current flowing through one of the motor windings as a balanced condition of the control means is approached, Figures 4 and 5 are schematic views of further modifications of my control system, Figure 6 is a diagram indicating the effect of a corrective unidirectional voltage that is employed in the systems of Figures 4 and 5, and Figure 7 is a schematic view of a further form of my control system.

Referring to the drawing for a more detailed understanding of the invention, the reference numeral 10 is employed to indicate generally a split phase motor. This motor comprises a rotor 11, preferably of the squirrel cage type. Associated with the rotor 11 are field windings 12 and 13.

A reference numeral 15 is employed to generally indicate a step-up-step-down transformer. The transformer 15 comprises a line voltage primary 16 which is connected to any suitable source of power (not shown) and a plurality of secondaries 17, 18, and 19. Secondary windings 18 and 19 are preferably higher voltage windings than the primary winding 16 while winding 17 is preferably a lower voltage winding.

The field winding 12 is connected to secondary winding 19 through conductors 21, 22, and 23 and a condenser 24. The condenser 24 is connected in series with field winding 12, it will be noted, and serves to displace in phase the current flowing to field winding 12. The lower end of field winding 12 is connected to ground at 14. A condenser 25 is connected in parallel with field winding 13. The energization of the field winding 13 and the parallel condenser 25 is controlled by an electronic discharge tube 26.

Tube 26 comprises an envelope 27 which houses a pair of triodes, the tube being of the double triode type. A first of these triodes comprises an anode 28, a control grid 29, and a cathode 30. The cathode 30 is a double cathode and is associated with both triodes. The second triode comprises the cathode 30, a grid 31, and an anode 32. It is to be understood that the cathode can be of either the directly heated or indirectly heated type. In the particular case of tube 26, the cathode is of the indirectly heated type. Since the manner in which the cathodes are heated forms no part of the present invention, the arrangements for heating the cathodes will not be discussed in connection with tube 26 or any of the other electronic devices of this or any of the subsequent species. It is to be understood that in all of the species, the electronic devices are of the type employing hot cathodes although the invention is in no way limited to the use of such tubes.

A resistor 33 and a condenser 34 are connected in parallel with each other and in series with the cathode. The resistor and condenser function to bias the grids 29 and 31 as will be more apparent from the subsequent description.

A further tube 35 is connected in parallel with the winding 12 and serves to vary the direct current component in the current flowing through winding 12. The tube 35 is a tetrode and comprises an anode 36, a shield grid 37, a control grid 38, and a cathode 39. The shield grid 37 is connected by conductor 40 to the cathode 39 as is customary. The anode 36 is connected by conductor 42 to the upper terminal of winding 12. The cathode 39 is connected to ground at 43. It will thus be seen that the anode and cathode of tube 35 are connected in parallel with winding 12. When the potential of grid 38 is such that the tube 35 is conductive, it will be obvious that the winding 12 is shunted on alternate half cycles. The potential that is applied to grid 38 is controlled by a potentiometer comprising a resistor 44 and a slider 45. Connected in parallel with the resistor 44 by conductors 46 and 47 is a condenser 48. The lower end of resistor 44 is connected to ground at 49. The upper end is connected to the anode 50 of a diode 52. The diode 52 is located within an evacuated envelope 53 and comprises the anode 50 and a cathode 54.

The energization of both tubes 26 and 35 is controlled by a normally balanced bridge generally indicated by the reference numeral 56. This bridge comprises two potentiometers 59 and 63. The potentiometer 59 constitutes the control potentiometer and comprises a resistance 60 and a contact arm 61 in slidable engagement with resistor 60. The position of contact arm 61 is controlled by a main controller schematically indicated in the drawing and designated by the reference numeral 62. The nature of the main controller 62 will depend upon the application of the motor control system. For example, the main controller may be a gyroscope if the rotor is to be used to control the rudder of an airplane. On the other hand, the main controller 62 may be a temperature responsive device if the motor control system is to be employed for the control of temperature.

The potentiometer 63 constitutes a follow up potentiometer. This potentiometer comprises a resistor 64 and a contact arm 65 in slidable engagement with the resistor 64. The contact arm 65 is secured to a shaft 66 associated with a controlled device 67. The controlled device is in turn connected by a shaft 68 to the rotor 11. In the majority of cases, the controlled device will include a reduction gear train so that the speed at which the controlled device is driven will be considerably less than the rotor speed. The particular nature of the controlled device will again depend upon the particular application of the motor control system. If the motor control system is employed in connection with an airplane control, the controlled device might be a rudder. On the other hand, in a temperature control system, the controlled device might be a steam valve, for example. In any event, the position of the contact arm 65 will depend upon the position of the controlled device 67.

The outer terminals of resistors 60 and 64 are connected together by conductors 57 and 58. The outer terminals of resistors 60 and 64 are further both connected by conductors 69 and 70 to the terminals of secondary winding 17. Thus, an alternating voltage is constantly applied to the outer terminals of resistors 60 and 64. The contact arms 61 and 65 constitute the output terminals of the bridge and the voltage existing between these two terminals is dependent upon the relative positions of the contact arms. The output voltage of bridge 56 is applied to tube 26 and tube 52 through coupling condenser 71 and coupling resistors 72 and 73.

While the values of the various elements form no part of the present invention, I have found it advisable in one embodiment of my invention to employ elements of the following values. In the case of tube 26, I employed a vacuum tube commonly known as a 7N7 tube. For the tube 35, I employed the gas filled tube known as a 2051 tube. For tube 52, one half of a 7F7 tube was employed with the grid connected to the cathode, although it is of course understood that a suitable diode, as shown in the drawing, would normally be employed. In this embodiment, I have found it desirable to employ a resistor of one megohm for resistor 44, and to employ a condenser of 0.01 microfarad for filter condenser 48. A resistor of one half megohm was employed for resistor 73. It is believed that the values of the various other elements will be

Figure 1:
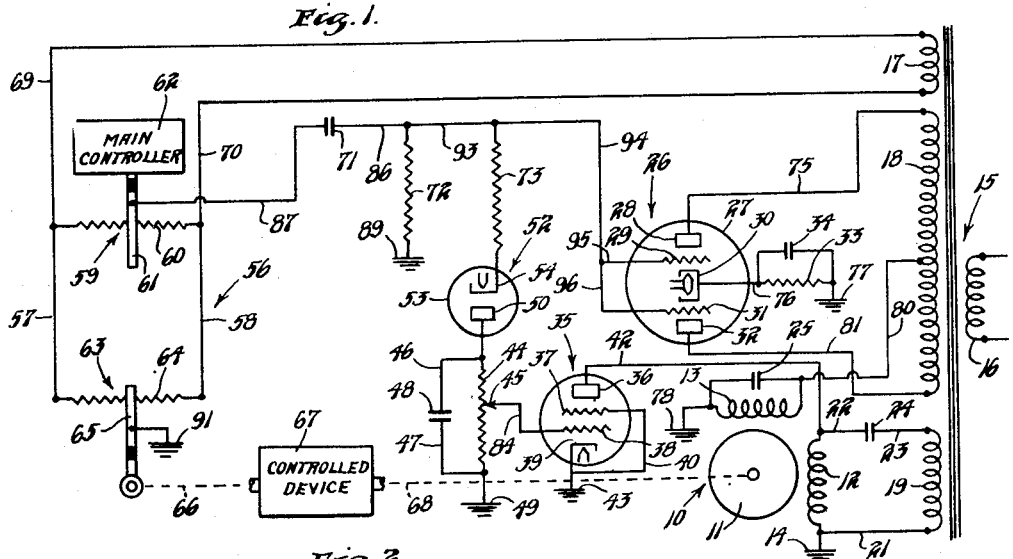
Figure 1 is a schematic view of one modification of my control system.

Operation of Figure 1 species

The various elements of the system are shown in the position they assume when the position of the controlled device corresponds substantially to that of the main controller. Under these conditions, the output voltage of the bridge 56 is negligible. While no voltage is applied to grids 29 or 31 from the bridge, the bias introduced by resistor 33 and condenser 34 is preferably of such a value that the grids 29 and 31 are maintained at a potential slightly above the cut-off potential. Under these circumstances, a slight amount of current flows to winding 13 through both triodes of tube 26. During one half cycle, current flows to winding 13 through the following circuit: from the upper terminal of secondary 18 through conductor 75, anode 28, cathode 30, conductor 76, resistor 33, ground connection 77, ground connection 78, winding 13, and conductor 80 to the center tap of winding 18. During the opposite half cycle, current will flow to winding 13 through the following circuit: from the lower terminal of secondary 18 through conductor 81, anode 32, cathode 30, conductor 76, resistor 33, ground connections 77 and 78, winding 13, and conductor 80 to the center tap of winding 18. In each case, the current will be relatively small due to the fact that the potential of grids 29 and 31 is only slightly above the cut-off potential. Due to the fact that the current flowing through winding 13 under these conditions is a full wave rectified current, there will be a very substantial direct current component.

As previously indicated, the tube 35 is connected in parallel with the winding 12. When the bridge 56 is unbalanced so that there is an unbalance voltage, a potential is impressed across resistor 44, as will be explained later. As a result of this potential, the control grid 38 is biased with respect to cathode 39. When, however, there is no unbalance signal as with the conditions being described, the grid 38 is, in effect, connected directly to the cathode 39, since there is no potential drop through conductor 84 and the lower portion of resistor 44, to ground connections 49 and 43. As a result, the tube 35 is conductive so that during those half cycles in which the anode 36 is positive with respect to the cathode 39, the winding 12 is effectively shunted. As a result, the current flowing through winding 12 will be a half wave rectified current and therefore has a very pronounced direct current component.

It will be seen from the above that when the bridge 56 is balanced, there is a pronounced direct current component in the current to both windings 12 and 13. This direct current component produces a braking effect on the rotor 11. This braking effect will continue as long as the balanced condition exists.

Now let it be assumed that the condition to which the main controller is responsive changes so as to cause a movement of contact arm 61 to the left. The effect of this will be to impress an alternating current potential across resistor 72. In this connection, it is to be noted that the upper end of resistor 72 is connected by a conductor 86, the condenser 71, and conductor 87 to the contact arm 61. The lower terminal of resistor 72 is connected by ground connections 89 and 91 to contact arm 65. Thus the resistor 72 is connected across the output terminals of the bridge 56. By reason of condenser 71, any unidirectional voltage is blocked so that the only voltage applied to resistor 72 is an alternating voltage. The upper terminal of resistor 72 is in turn connected by conductors 93, 94, and 95 to grid 29. The upper terminal of resistor 72 is also connected by conductors 93, 94, and 96 to grid 31. When the contact arm 61 is moved to the left, the potential applied to grid 29 is in phase with the potential applied between anode 28 and cathode 30 so that the potential of grid 29 is raised with respect to the potential of cathode 30 during the conductive half cycle. Since the potential between anode 32 and cathode 30 of the other triode is displaced 180° in phase from that applied between anode 28 and cathode 30, the effect of the same unbalance voltage on grid 31 is to further lower the potential of the grid with respect to the cathode during the time that the potential on anode 32 is in conductive direction. Thus, the effect of the unbalance voltage due to a movement of contact arm 61 to the left is to increase the conductivity of the triode including anode 28 and decrease the conductivity of the triode including anode 32. As a result, the current flow in one half cycle through winding 13 will be increased while that through the other half cycle will be decreased. The effect of this is to introduce a pronounced alternating current component into the current flowing through winding 13. The presence of condenser 25 tends to improve the wave form of the alternating current component. Condenser 25 and winding 13 furthermore tend to assume a condition of parallel resonance and thus increase the impedance of the output circuit of tube 26 so that the impedance of the output circuit more nearly assumes the value for optimum operation of the rectifier 26.

The presence of the unbalance voltage also effects the bias of grid 38. The upper end of resistor 73 is connected by conductors 93, 86, and 87 to contact arm 61. The lower terminal of resistor 44 is connected by ground connections 49 and 91 to contact arm 65. Thus, an alternating voltage is impressed across the resistors 73 and 44 which are connected in series with each other by rectifier 52. Because of the presence of rectifier 52, current can only flow through the resistor elements 44 and 73 during the half cycles in which the ground connection 49 is positive with respect to the upper terminal of resistor 73. As a result, a voltage is applied across resistor 44, the polarity of this voltage being such that the lower end of resistor 44 is positive and the upper end negative. It will be readily apparent that since the lower end is connected by ground connections 49 and 43 to cathode 39 that the effect of such a voltage will be to bias grid 38 negatively. The position of contact 45 is so selected that upon an appreciable unbalance voltage occurring, the grid 38 will be biased below the cut off point of tetrode 35 so that the shunting action of tube 35 on winding 12 will no longer be present. As a result, the current flowing through winding 12 will be an alternating current. The voltage drop across winding 12 will be displaced in phase with respect to the voltage of secondary 19, by substantially 90° due to the condenser 24.

It has already been pointed out that there is now a pronounced alternating current component in the current flowing through winding 13. As a result, the windings 12 and 13 will be energized by alternating current, the current through winding 13 being displaced 90° from that through winding 12. The motor will accordingly rotate in one direction. This direction is such that the shaft 66 is rotated in a counterclockwise direction, resulting in a counterclockwise movement of the controlled device and contact arm 65. This rotation will continue until contact arm 65 assumes substantially the same position as the contact arm 61 of the controlling potentiometer. When this happens, the unbalance voltage of the bridge will again assume a negligible value with the result that the two triodes of tube 26 will again be equally conductive and with the further result that grid 38 will no longer be biased negatively with respect to cathode 39. The effect of this latter condition is to again cause tube 35 to act as a shunt to winding 12 and to introduce a pronounced direct current component. The introduction of this direct current component into the current flowing through winding 12 with the reduction in the alternating current flowing through winding 13 will cause a pronounced braking action to take place so that rotor 11 is quickly stopped. As pointed out earlier, this is highly desirable since if the condition is to be accurately controlled, it is essential that the movement of the controlled device be terminated immediately upon its position corresponding to the position of the controlling condition.

In the event of the main controlling condition changing in the opposite direction so that contact arm 61 is moved to the right, an unbalance voltage will again be impressed across resistor 72. This unbalance voltage will be displaced 180° in phase, however, from that which exists under the conditions previously considered. As a result, the potential of grid 31 will be increased during the conductive half cycle of anode 32 and that of potential 29 decreased during the conductive half cycle of anode 28. Under these conditions, a pronounced alternating current component will be introduced into the current flowing through winding 13 but this alternating current component will be displaced 180° in phase from that existing under the previously described conditions. Similarly, the presence of this unbalance voltage will again apply a potential between ground connection 49 and the upper end of resistor 73 with the result that a voltage is impressed across resistor 44 of such polarity that the lower end is positive with respect to the upper. This again will bias grid 38 negatively so that the tube 35 is no longer conductive and so that the winding 12 is no longer shunted. As a result, an alternating current again flows in both windings 12 and 13. The alternating current in winding 13 is again displaced 90° in phase from that flowing through winding 12 but is displaced 90° in the opposite direction from that previously considered. As a result, the rotor 11 turns in the opposite direction to cause the controlled device to move oppositely to that previously considered. This opposite movement of the controlled device is accompanied by a movement of contact arm 65 to the right so as to tend to rebalance the system. When contact arm 65 occupies a position corresponding to the position of contact arm 61, the unbalance voltage will no longer exist with the result that the braking action previously described again takes place.

It will be seen that I have provided an arrangement whereby without the use of auxiliary windings or mechanical devices, a braking action is automatically applied to the motor whenever a balanced condition is obtained. In this manner, it is possible to cause the motor to drive the positioned object quickly to the desired position without any danger of "overshooting."

Figure 2:
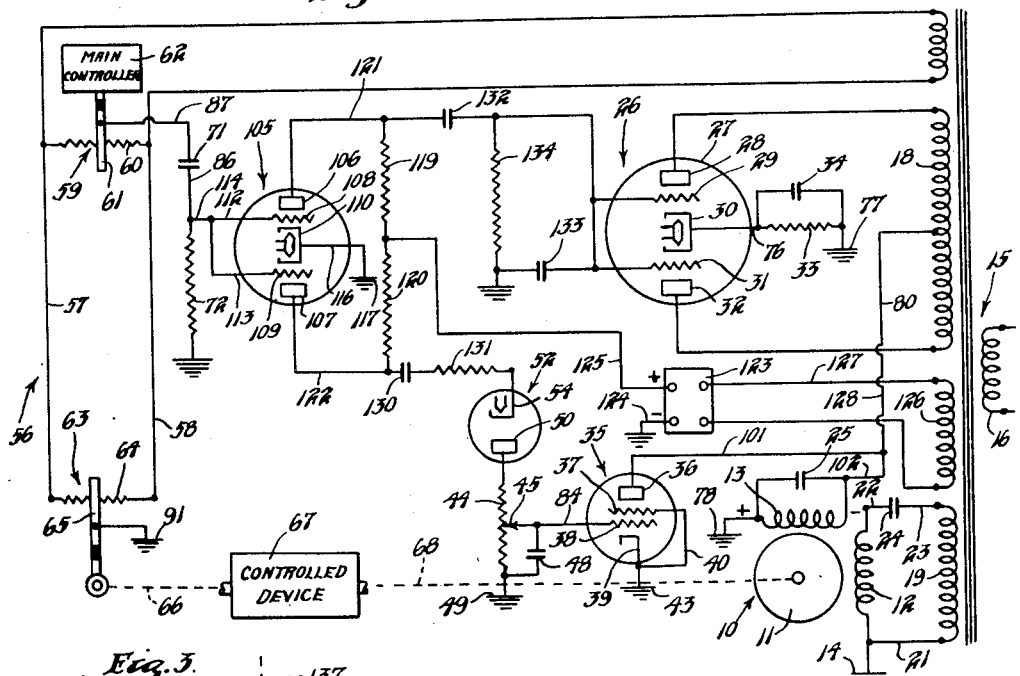
Figure 2 is a schematic view of a modified form of my control system.

Species of Figure 2

The arrangement of Figure 2 differs from the arrangement of Figure 1 primarily in that the rectifier connected in parallel with the motor winding is connected in parallel with the winding whose energization is controlled by the main controlling bridge. This leads to certain advantages not obtained with the arrangement of Figure 1.

In order to enable a ready comparison of Figures 1 and 2, similar reference characters have been employed to designate corresponding elements. It is not believed necessary to again describe these elements in detail.

The shunting rectifier 35, which again is indicated by the reference numeral 35 is in the present species connected in parallel with winding 13. The anode 36, instead of being connected to the upper terminal of winding 12, is connected by conductors 101 and 102 to the ungrounded terminal of winding 13. Since cathode 39 is grounded, it is connected to the grounded terminal of winding 13.

In the present species, instead of having the output voltage of the bridge 56 connected directly to the grids 29 and 31 without amplification, a further amplifier 105 is employed. This amplifier is of the double triode evacuated type having a pair of anodes 106 and 107 and a pair of control grids 108 and 109 associated with a double cathode 110. The grids 108 and 109 are connected together by conductors 112 and 113. The conductors 112 and 113 are in turn connected by conductor 114 to the upper terminal of resistor 72. Since the cathode 110 is connected by conductor 116 to ground at 117, it will be obvious that resistor 72 is connected between the grids 108 and 109 and cathode 110 in the same relative position as resistor 72 was connected to the grids and cathode of tube 26 in the species of Figure 1. Resistors 119 and 120 are connected in series between anodes 106 and 107 by conductors 121 and 122. A D. C. power supply unit 123 has its input terminals connected by conductors 127 and 128 to a secondary 126 of transformer 15. The power supply unit 123 is designed to provide in the conventional manner a source of filtered unidirectional voltage. The negative output terminal of the power supply unit 123 is connected to ground as at 124. The positive terminal is connected by conductor 125 to the junction of resistors 119 and 120. A blocking condenser 130 and a resistor 131 are connected between the lower terminal of resistor 120 and cathode 54 of the diode 52. Coupling condensers 132 and 133 and coupling resistor 134 are connected between the tube 105 and grids 29 and 31.

Operation of species of Figure 2

The various elements are shown in Figure 2 in the position which they assume when the control system is balanced. Under these circumstances, there is no unbalance voltage so that no appreciable voltage exists across the resistor 72. As a result, there is no signal current flow through resistors 119 and 120 and no signal voltage is applied to grids 29 and 31. As with the preceding species, the grids 29 and 31 are biased so that a very slight current flows through each triode to winding 13. It is believed unnecessary to trace these circuits again. In the present case, however, the winding 13 is shunted by the tube 35. As a result, the current flow through winding 13 tends to have a pronounced unidirectional component. As will be described in more detail later, this shunting effect is not quite as pronounced at the exact balance point, however, due to the fact that while the potential of grid 38 is sufficiently high to render the triode conductive, the voltage applied across the plate circuit of the tube is relatively small due to the fact that the system is nearly balanced and the voltage applied across winding 13 is very small. Since the tube 35 is connected in parallel with winding 13, the voltage applied to its anode circuit corresponds in magnitude to the voltage applied to winding 13 and hence depends upon the extent of unbalance of the system.

Now let it be assumed that the condition to which the main controller 62 responds changes so as to cause a substantial movement of contact arm 61 to the left. Under these circumstances, an alternating voltage will be impressed across resistor 72. In alternate half cycles, the effect of this voltage will be to raise the potentials of grids 108 and 109 with respect to cathode 110. When this happens, the current will flow through resistor 119 as follows: from the positive terminal of power supply unit 123 through conductor 125, resistor 119, conductor 121, anode 106, cathode 110, conductor 116, and ground connections 117 and 124 to the negative terminal of the power supply unit. The effect of this current flow will be to produce a pulsating voltage across resistor 119, the polarity of this voltage being such that the lower terminal of resistor 119 is positive with respect to the upper terminal. At the same time, a current flow takes place through resistor 120 as follows: from the positive terminal of power supply unit 123 through conductor 125, resistor 120, conductor 122, anode 107, cathode 110, conductor 116, and ground connections 117 and 124 to the negative terminal of power supply unit 123. The current flow through this latter circuit is in the opposite direction so that the polarity of the pulsating voltage produced across resistor 120 is such that the upper end of resistor 120 is positive with respect to the lower end.

The alternating component of the pulsating voltage across resistor 119 is applied through condenser 132 to resistor 134. This voltage is in turn impressed on to grids 29 and 31. The effect of the alternating voltage applied to grids 29 and 31 is that the current flow through winding 13 during one half cycle will be increased and that through the other half cycle decreased, in the manner previously described in connection with Figure 1. The condenser 133 is provided to insure the correct phase relation between the voltage applied to grids 29 and 31 with respect to that applied to anodes. As a result, a pronounced alternating current will flow through winding 13. Thus, the effect of an unbalance voltage on the energization of winding 13 will be similar to that previously described in connection with Figure 1. By reason of the presence of amplifier 105, it is possible to use a somewhat less sensitive bridge than is used with the species of Figure 1. The operation otherwise is substantially the same.

The pulsating component of the voltage across resistor 120 is impressed across the series connected blocking condenser 130, resistor 131, the diode 52, and the resistor 44. Since current can only flow through the diode in negative half cycles, the result will be that an unidirectional voltage will be impressed across resistor 44. Again, since the upper end of the resistor 44 is connected to anode 50, the polarity of the voltage will be such that the lower end of resistor 44 will be positive with respect to the upper end. As with the previous species, that portion of the voltage between the lower end of resistor 44 and the tap 45 is applied to grid 38 to bias it negatively. In the present form, the condenser 48 is shown as connected between the lower end of resistor 44 and tap 45 instead of across the entire resistor 44. It is to be understood, however, that the condenser 48 may be connected in either location. In any event, the effect of a substantial unbalance is to create a biasing voltage on grid 38 sufficient that the gas filled tube 35 is rendered non-conductive. As a result, the tube 35 does not affect in any way the current flow through winding 13. The result is that the current flowing through winding 13 is an alternating current with a very small direct current component due to the rectifying effect of the tube 26. The current flowing through winding 12 is also an alternating current. Because of the condenser 24, the current flowing through winding 12 is displaced 90° in phase from that flowing through winding 13. As a result, the rotor 11 is rotated so as to drive the controlled device 67 and to move contact arm 65 towards the left so as to tend to rebalance the system. When there has been sufficient movement of the controlled device, the position of contact arm 65 will correspond to that of contact 61 so that the unbalance voltage will again drop to zero.

As the unbalance voltage approaches the zero value, the bias exerted upon grid 38 will decrease. The result is that the conductivity of tube 35 will increase. The initial effect of this is to cause a substantial amount of current to flow through tube 35 so that the tube 35 exerts an appreciable shunting effect on winding 13 during each half cycle. It will be recalled that in tracing the circuit to winding 13 through either of the triodes of tube 26, the circuits were traced in such a manner that the right hand end of winding 13 would tend to be negative with respect to the left hand end as far as the unidirectional component is concerned. It is to be further noted that it is the left hand end that is connected to the cathode and the right hand end that is connected to the anode 36. As a result of this, the tube 35 offers no shunting effect to the unidirectional component of the voltage across winding 13. Due to the fact that the parallel combination of resistor 33 and condenser 34 has a much lower impedance to alternating current of the frequency of the source than the parallel combination of inductive winding 13 and condenser 25, the voltage drop across the former combination is predominantly unidirectional while that across the latter combination is predominantly alternating. Thus, there tends to be actual reversal in the relative polarity of the opposite terminals of condenser 27. During alternate half cycles in which the right-hand terminal of condenser 25 tends to be positive with respect to the left-hand terminal, the tube 35 acts as a shunt around winding 13. As a result, the total unidirectional component of the current flowing through winding 13 is initially greatly increased so as to produce a pronounced braking action on rotor 11.

The condition just described occurs just as the balanced condition is being approached. At this time, the change in the potential of grid 38 has a more pronounced effect upon tube 35 than does the decrease in plate voltage by reason of the reduction in voltage across winding 13 because of the rebalancing action. As the balance point is approached more nearly, however, the reduction in voltage across winding 13 and hence across the anode circuit of tube 35 begins to have a more pronounced effect than the change of potential on grid 38. This is highly desirable since the result is that there is a very pronounced braking action just as the system approaches the balance point with a decrease in the braking action as the system reaches the balance point and the motor stops rotating. This action is shown graphically in Figure 3 in which line 137 indicates the balance point and in which line 138 indicates the increased direct current component of the current flowing through winding 13. It is to be noted that at a point slightly on each side of the balance point, the direct current component reaches a peak value substantially above the value assumed at the balance point.

A further advantage of this arrangement is that the braking effect controlled by the tube 35 is dependent both upon the voltage indicating the approach to balance and also upon the voltage across the winding 13. Even if the tube 35 has ceased to supply current to winding 13 and the rotor 11 is still rotating, a voltage exists across winding 13 due to the transformer effect between constantly energized winding 12 and winding 13. This transformer effect, as is well known, is dependent upon the speed of rotation and hence exists only when rotor 11 is rotating. Thus, as long as rotor 11 is rotating, after the system has approached balance, a voltage exists across rectifier 35 to cause direct current to be applied to winding 13. Thus the braking effect is not only made dependent upon the approach to balance but also upon the speed of the motor as determined by the voltage across the motor winding 13.

In the event of the condition changing in the opposite direction so that contact arm 61 is moved to the right, the alternating voltage impressed across resistor 72 is 180° displaced in phase from that which existed under the previously described conditions of unbalance. As a result, the pulsating voltages produced across resistors 119 and 120 will be displaced 180° in phase from those previously considered. Thus, the effect on grids 29 and 31 will be opposite to that just considered so that the alternating current caused to flow through winding 13 will be displaced 180° in phase from that previously considered. This alternating current will again be displaced 90° from that flowing through winding 12 but will be displaced 90° in the opposite direction. The effect of the current flow through winding 13 will accordingly be to cause rotor 11 to rotate in the opposite direction so as to move the controlled device 67 in the opposite direction and the contact arm 65 towards the right to rebalance the system.

The effect of the unbalance voltage will be the same on the grid 38 due to the presence of rectifier 52. In other words, the grid 38 will be biased negatively so as to render tube 35 non-conductive and hence ineffective as a shunt for winding 13.

It will be seen that with the species just described, I not only obtain a pronounced braking effect as the balance point is approached but this braking effect is dependent upon the speed of the motor and is reduced immediately as soon as the motor comes to rest at the balance point. The system has a further advantage over the system of Figure 1 in that the power drawn from secondary 19 is considerably reduced. With the arrangement of Figure 1, the impedance across winding 12 is materially reduced during every other half cycle when the motor is not running, so as to cause a very substantial power drain from secondary 19. With the system of the present species, the current flow through the tube 35 is substantially less when the balanced condition exists.

Species of Figure 4

In the species of Figure 4, the braking effect is obtained by direct current which is constantly applied to one of the motor windings. This direct current during the normal operation of the motor neutralizes the direct current component introduced by the rectifier. As soon as the system approaches balance so that the unidirectional voltage component due to rectification is no longer present, the direct current then acts to produce a braking effect.

In the arrangement of Figure 4, transformer coupling is employed between the discharge device controlling the energization of the motor and the bridge. In order to simplify the showing, the bridge and the various connections between the bridge and the primary of the coupling transformer have been omitted. Since the bridge 56 is not shown, the secondary 17 has also been omitted from the drawing.

The reference numeral 150 is employed in Figure 4 to designate a gas filled double triode discharge device corresponding in structure to tube 26 of the species of Figures 1 and 2. This discharge device comprises a gas filled envelope 151 in which is located an anode 152, a control grid 153, a cathode 154, a second control grid 155, and a second anode 156. As with tube 26, the anode 152, grid 153, and cathode 154 constitute one triode while the anode 156, grid 155, and cathode 154 constitute a second triode. The tube 150 controls the current flow through winding 13. The potential of grids 153 and 155 is in turn controlled by the unbalance voltage. The two grids 153 and 155 are connected by conductors 160, 161, and 163 to one terminal of the secondary of the coupling transformer 164. The coupling transformer 164 comprises a secondary 165 and a primary 166. The primary is connected by a suitable coupling element and by an amplifier, if necessary, to the output terminal of a bridge corresponding to bridge 56.

A pair of tubes 170 and 171 are employed as rectifiers for supplying a corrective direct current. Each of the tubes 170 and 171 is a vacuum type diode. Tube 170 comprises an anode 173 and a cathode 174. The tube 171 comprises an anode 175 and a cathode 176.

The diodes 170 and 171 are also employed to supply a biasing potential to the grids 153 and 155 of tube 150. This is accomplished through a resistor 177 and a condenser 178 connected in parallel with a resistance. Slidably engaged with resistor 177 is a contact 179. The contact 179 is connected by conductor 181 with the terminal of secondary 165 opposite to the terminal to which grids 153 and 155 are connected.

Operation of species of Figure 4

Upon the bridge being unbalanced in either direction, an alternating voltage will be induced in secondary 165. The phase position of this alternating voltage will depend upon the direction of unbalance.

Depending upon the phase position of the alternating voltage induced in secondary 165, one or the other of the triodes of tube 150 will become more conductive and the other less conductive just as with the species of Figures 1 and 2. As a result, an alternating current will flow through winding 13. It is to be understood, however, that this alternating current is not a pure alternating current but rather a rectified alternating current. To a certain extent, the condenser 25 will round the portion of the current wave that would otherwise be flat. Nevertheless, the resulting wave still has a very pronounced direct current component which also serves to distort the wave form.

At all times a circuit may be traced from the secondary 18 through each of the diodes 170 and 171. The circuit through diode 170 is as follows: from the center terminal of secondary 18 through conductor 80, winding 13, ground connections 78 and 77, conductor 76, conductor 184, resistor 177, conductors 185 and 186, anode 173, cathode 174, and conductors 187 and 75 to the upper terminal of secondary 18. During the opposite half cycle the current flows through diode 171 as follows: from the center tap of secondary 18, through conductor 80, motor winding 13, ground connections 78 and 77, conductor 76, conductor 184, resistor 177, conductors 185 and 188, anode 175, cathode 176, and conductors 190 and 81 to the lower terminal of secondary 18. It will be seen from the above that the two diodes 170 and 171 act together as a full wave rectifier so that the current flowing through winding 13 and resistor 177 is a full wave rectified current. By reason of the condenser 178, much of the alternating current component of this full wave rectified direct current is filtered out so that the voltage across resistor 177 is substantially a unidirectional constant voltage. Furthermore, the current through winding 13 produced by the action of diodes 170 and 171 is likewise substantially a direct current. It will be noted that this direct current is in a direction opposite to the current flow due to the rectifying action of the triodes of tube 150. The result is that the two direct current components tend to cancel each other out and produce a wave form more nearly that of an alternating current.

The action of the corrective unidirectional voltage is indicated diagrammatically in Fig. 6. In that figure, the rectified voltage applied to winding 13 is indicated by the light solid line 195. It will be noted that half of this line 195 consists of horizontal portions 196 due to the action of the rectifier. While there is some tendency for condenser 25 to round these peaks, the resulting voltage is still far from an alternating voltage. The dotted line 198 is employed to indicate the corrective unidirectional voltage that is applied by reason of the rectifying action of diodes 170 and 171. The heavy solid line 199 indicates the resulting voltage. It will be noted that the effect of the addition of the unidirectional voltage is to lower the peaks of the rectified voltage and to add a corrective curved portion to the flat portion due to rectification. As a result, the resulting potential is an alternating potential which is shifted only slightly from the zero axis. In other words, the unidirectional component is relatively small.

As soon as the system becomes balanced, the unidirectional voltage introduced by reason of rectifiers 170 and 171 performs a new function. Upon the unbalanced voltage disappearing, the unidirectional voltage introduced by reason of the rectifying action of the triodes of tube 150 likewise disappears so that the only voltage which is applied to winding 13 is that indicated by the dotted line 198. As a result, the winding 13 is now energized by the unidirectional voltage which acts to produce a braking effect.

The direct current introduced by the action of rectifiers 170 and 171 plays a two-fold purpose. During normal operation of the motor, the function of direct current is to improve the wave form of the current flowing through winding 13. This causes an increase in the speed of the motor. As soon as it is desired to terminate operation of the motor, the direct current then functions to produce a desirable braking effect so as to result in the movement of the motor quickly being terminated.

The rectifiers 170 and 171 have a still further effect. As is previously noted, the circuit through these rectifiers to winding 13 includes the resistor 177. As also pointed out, the two rectifiers function to produce a substantially constant unidirectional voltage across resistor 177. This voltage is applied to bias the grid of tube 150. Since the tube 150 is a gas filled tube, it is non-conductive when the system is balanced. For this reason, the tube is unable to supply its own current for biasing the grid negatively as is the case with the tube 26 of Figures 1 and 2. It is to be noted that the connection between grids 153 and 155 and cathode 154 includes not only secondary 165 but that portion of resistor 177 to the right of contact 179. As a result, the voltage applied to grids 153 and 155 not only includes the signal voltage but also a voltage of such polarity as to tend to bias the grids 153 and 155 negatively by an amount determined by the position of slider 179.

It will be seen that in the present species, I have provided an arrangement whereby the means for supplying the braking action upon termination of the operation of the motor also functions to improve the operation of the motor by correcting the wave form of the current applied to the motor windings. It will also be seen that the means for supplying the direct current to improve the operation of the motor and to provide a braking action also provides means for biasing the grids of the controlling electronic device negatively so that it is possible to use for this purpose a gas filled tube.

*Species of Figure 5*

The species of Figure 5 is very similar to that of Figure 4 in that direct current is supplied to winding 13 to correct for the direct current component introduced by reason of the action of the controlling discharge device. The principal difference between the two figures is that a vacuum type triode 26 is employed in lieu of the gas filled tube 150. Because of this fact, it is possible for the tube to supply its own bias by reason of the resistor 33 and condenser 34. Consequently, the tubes 170 and 171 do not function as in the species of Figure 4 to supply biasing potential for the tube 26.

Referring to the drawing, the reference numeral 200 is employed to indicate a load resistor which is connected by conductor 185 to the junction of conductors 186 and 188 leading to the two anodes 173 and 175. The right hand terminal of resistor 200 is connected to ground at 201. This right hand terminal is connected through the ground connection 201 and a ground connection 202 to the lower terminal of secondary 165 of the coupling transformer 164.

In the present species, the following circuits exist to winding 13 and the diodes 170 and 171. In the first place, a circuit exists from the midpoint of secondary 18 through conductor 80, winding 13, ground connections 78 and 201, resistor 200, conductors 185 and 186, anode 173, cathode 174, and conductors 187 and 75 to the upper terminal of secondary 18. The following circuit also exists through diode 171: from the center tap of secondary 18 through conductor 80, field winding 13, ground connections 78 and 201, resistor 200, conductors 185 and 188, anode 175, cathode 176, and conductors 190 and 81 to the lower terminal of secondary 18.

It will be seen from the above that the circuits through diodes 170 and 171 correspond identically with the equivalent circuits in Figure 4 with the exception that instead of the resistor 177, a resistance 200 is located in the circuits through the two diodes, this resistance constituting the load resistor. As with the species of Figure 4, the D. C. component introduced into the current flowing through winding 13 by reason of diodes 170 and 171 is opposite in direction to the D. C. component of the current introduced by reason of the action of rectifier 26.

Furthermore, this current functions as soon as the control bridge is rebalanced to cause a braking action so as to quickly terminate movement of the rotor 11.

The subject matter of Figures 4, 5 and 6 is disclosed and claimed in my copending divisional application Serial No. 59,608, filed November 12, 1948, for Motor control system.

Species of Figure 7

In the species of Figure 7, the direct current for causing the braking effect is obtained by the discharge of a condenser which is charged during the normal operation of the motor.

While the system of Figure 7 is similar in many respects to that of the remaining figures, there are sufficient differences in structure that corresponding reference numerals are employed only in connection with the controlling bridge which is identical to that of the species previously described.

The motor, which is controlled by the system of Figure 7, is designated by the reference numeral 210. This motor comprises a rotor 211 and a pair of field windings 212 and 213. One terminal of each of the field windings 212 and 213 is connected together as at 214. A condenser 219 is connected in parallel with windings 212 and 213. This condenser is in series with one or the other of the windings, depending upon which of two motor energizing circuits is effective. The condenser 219 acts as a phase shifting condenser as will be more apparent from the subsequent description.

Power for operation of the system is supplied by a transformer 215. The transformer 215 comprises a primary winding 216 and secondary windings 217, 218, 220 and 226. The secondary winding 217 is connected by conductors 69 and 70 to the phase shifting bridge 56 in the same manner as was secondary 17 of the previously described species. The secondary 218 is employed for energizing the motor under the control of two electronic tubes 230 and 231. The secondary winding 220 is employed to energize the heaters of the cathodes of the various electronic tubes employed in the motor control system. Since the connections between secondary 220 and the cathode heaters do not form an essential part of the present invention and since a showing of these connections would unduly complicate the drawing, these connections have been omitted.

The secondary 226 is connected by conductors 227 and 228 to the input terminals of a D. C. power supply unit 223 corresponding to the power supply unit 123 of the species of Figure 2.

Tubes 230 and 231 are each a gas filled tube. The tube 230 comprises a gas filled envelope 232 enclosing an anode 233, a cathode 234, a shield grid 235 and a control grid 236. The shield grid 235 is connected to the cathode 234, as is conventional. The tube 231 likewise comprises a gas filled envelope 238 which encloses an anode 239, a cathode 242, a shield grid 240, and a control grid 241. The shield grid 240 is connected to cathode 242. The tubes 230 and 231 control the energization of windings 212 and 213 through the aid of a pair of resistors 244 and 245, a pair of condensers 246 and 247, a third condenser 248, and a resistor 249. The function of these various elements will be described later.

The output of the bridge 56 is amplified by means of a vacuum tube 252. This tube 252 comprises a first anode 253, a first control grid 254, a cathode 255, a second control grid 256, and an anode 257. The anodes 253 and 257 are connected to the output terminals of a resistor 259 through condensers 260 and 261. Associated with the resistor 259 are adjustable contacts 262 and 263. The contacts 262 and 263 are connected to grids 254 and 256 by conductors 264 and 265, respectively. The cathode 255 is connected by conductor 268 to the midpoint of resistor 259. The output terminals of resistor 259 are connected by conductors 270 and 271 to contact arms 61 and 65, which constitute the output terminals of the control bridge. The output voltage of the control bridge is thus impressed across resistor 259. The resistor 259 serves to impress predetermined portions of the output voltage upon grids 254 and 256. The magnitude of this voltage impressed upon each of the grids for any given value of output voltage is determined by the setting of sliders 262 and 263. The output of the upper triode of tube 252 is impressed across a resistor 275 which is connected through a condenser 276 and a coupling resistor 277 to the grid 236 of tube 230. The output of the lower triode of tube 252 is impressed across a resistor 280. The voltage across this resistor is in turn applied to the grid circuit of tube 231 through a coupling condenser 281 and a coupling resistor 282.

Operation of species of Figure 7

The various elements are shown in Figure 7 in the position which they occupy when the system is balanced, just as is the case in the other figures of the drawing, previously described. With the elements in this position, the voltage output of the bridge is zero so that no alternating voltage is impressed across the resistor 259. If any current flow takes place in the output circuits of tube 252, such current flow will be a direct current flow and will not be transmitted through blocking condensers 276 and 281 to the grids of tubes 230 and 231. Tubes 230 and 231 will be non-conductive under these circumstances due to the biasing potential applied to the grids 236 and 241 by means of the power supply unit 223. The intermediate positive terminal 286 of power supply unit 223 is connected by conductor 289 to the cathodes 234 and 242. The negative terminal 287 of the power pack is connected through ground connections 224 and 290 to the junction of resistors 277 and 282. The grid is thus connected to the cathode 234 through conductor 292, resistor 277, ground connections 290 and 224, negative terminal 287, positive terminal 286, and conductor 289 to cathode 234. Similarly, the grid 241 is connected to cathode 242 through conductor 293, resistor 282, ground connections 290 and 224, negative terminal 287, positive terminal 286, and conductor 289. In each case, the grid circuit includes one of the resistors 277 and 282 and that portion of the output of the power supply unit 223 between terminals 286 and 287 negatively in each case by this portion of the voltage output of the power supply unit. Hence, as long as no unbalance voltage exists, the two gas filled tubes 230 and 231 are non-conductive so that the field windings 212 and 213 are not energized.

Let it be assumed now that the condition to which control device 62 is responsive changes so that contact arm 61 is moved slightly to the left. Under these circumstances, an alternating voltage will be impressed upon the resistor 259. The effect of this alternating voltage will be to cause the potential of grids 254 and 256 to approach the potential of the anodes 253 and 257 during opposite half cycles. Each time that the potential of the grid 254 is raised with respect to the cathode 255, current flows through resistor 275 through the following circuit: from the positive terminal 285 of the power supply unit 223 through conductor 295, resistor 275, conductors 296 and 297, anode 253, cathode 255, and ground connections 299 and 224 to the negative terminal 287 of power supply 223.

During the opposite half cycle, the current flows through resistor 280 as follows: from the positive terminal 285 of the power supply 223, through conductor 295, resistor 280, conductors 301 and 302, anode 257, cathode 255, and ground connections 299 and 224 to the negative terminal of power supply 223.

It will thus be seen that the effect of a voltage unbalance is to produce unbalance voltages across resistors 275 and 280, these unbalance voltages being 180° displaced in phase from each other. The phase positions of the unbalance voltages will be dependent upon the direction of unbalance of the bridge. The alternating component of the pulsating voltage applied to resistors 275 and 280 will be impressed across resistors 277 and 282. The condensers 276 and 281 will act as blocking condensers to prevent any of the direct current component of the voltages across resistors 275 and 280 from being impressed on resistors 277 and 282.

The grid circuits of tubes 230 and 231 have previously been traced. It will be recalled that in each case the grid circuit included that portion of the power supply 223 between terminals 286 and 287 and one of the resistors 277 and 282. Specifically, the input circuit of tube 230 included resistor 277 and that of tube 231, the resistor 282. Thus, the presence of an alternating voltage across resistor 277 will impress an alternating voltage of corresponding phase on grid 236. Similarly, the alternating voltage on resistor 282 will be impressed on grid 241. Since the pulsating voltages across resistors 275 and 280 are 180° out of phase with each other, the alternating voltages across resistors 277 and 282 will be similarly displaced in phase from each other. The system of the present invention is different from that of the preceding species in that the anodes of both triodes 230 and 231 are connected to a point of corresponding phase with respect to the point of the power supply to which cathode 234 is connected. In other words, both anodes 233 and 239 are positive with respect to the cathode during the same half cycle. Due to the fact that the voltages impressed on grids 236 and 241 are 180° displaced in phase from each other, however, only one of the tubes 230 and 231 will be conductive. The direction of unbalance of the bridge 56 will determine which tube is conductive.

Under the conditions assumed, the contact arm 61 has moved to the left. With an unbalance voltage of this phase, the effect of the amplified unbalance voltage on grids 236 and 241 is to increase the potential of grid 241 with respect to cathode 242 during the half cycle in which the anodes are positive with respect to the cathodes, and to decrease the potential of the grid 236 with respect to the cathode 234 during this half cycle. Thus, the tube 231 is rendered conductive as a result of this unbalance voltage. The effect of this is to cause a current flow through winding 213 as follows: from the lower terminal of secondary 218 through conductor 305, conductor 306, condenser 248, conductor 307, winding 213, and conductors 308, 309, 310, and 311, anode 239, cathode 242, and conductors 312 and 313 back to the upper terminal of secondary 218. At the same time, a circuit will be established to field winding 212 as follows: from the lower terminal of secondary 218 through conductors 305 and 306, condenser 248, conductor 307, winding 212, conductors 327 and 315, condenser 219, and conductors 316, 309, 310, and 311, anode 239, cathode 242, and conductors 312 and 313 back to the upper terminal of secondary 218. It will be noted that the circuit for winding 213 included only condenser 248 while the circuit to winding 212 included both the condensers 248 and 219. The condenser 219 acts as a phase shifting condenser to displace the phase of the current through winding 212 with respect to that through winding 213. Due to the fact that the circuit to winding 212 includes condenser 219, the current to winding 212 will lead that through winding 213 so that the rotor 211 will revolve in a clockwise direction. This will cause a movement of the controlled device and the arm 65 in a counterclockwise direction so as to move arm 65 to the left to rebalance the system.

The voltage which is applied to windings 212 and 213 through the circuits traced in the preceding paragraph is a rectified voltage which is substantially zero during alternate half cycles. It is desirable if the optimum operating conditions are to be obtained to have the wave form of the current flowing through windings 212 and 213 as nearly the wave form of an alternating current as possible. I accordingly employ several novel expedients to improve the wave form of this alternating current.

In the first place, I provide an alternative path to the motor windings 212 and 213 which does not include either the tubes 230 or 231. The effect of this circuit is to apply a certain amount of alternating current directly to the winding. The circuit to winding 213 may be traced as follows: from the lower terminal of secondary 218 through conductors 305 and 306, condenser 248, conductor 307, field winding 213, conductors 308, 309, and 317, condenser 246, conductors 319 and 320, resistor 249, and conductors 322 and 313 to the other terminal of secondary 218. Similarly, there is a circuit through winding 212 as follows: from the lower terminal of secondary 218 through conductors 305 and 306, condenser 248, conductor 307, winding 212, conductor 327 and 315, condenser 219, conductors 316, 309, and 317, condenser 246, conductors 319 and 320, resistor 249, and conductors 322 and 313.

The presence of these auxiliary circuits through windings 212 and 213, which auxiliary circuits serve to supply unrectified alternating current to the windings, tends to improve the wave form of the current flowing through windings 212 and 213. This action is further increased by the presence of condenser 248 in series with windings 212 and 213. Because of the presence of condenser 248, the direct current component of the rectified voltage is blocked and is not applied to windings 212 and 213. As a result, the only current that can flow to the windings is the alternating current. The direct current component passes through resistor 244 in the case of tube 231 being conductive or through resistor 245 in the case of tube 230 being conductive.

The condenser 248 plays a further very important function in the operation of my motor control system. When the system is first unbalanced, there is an initial flow of direct current through condenser 248 until the condenser 248 becomes charged. Thereafter, the only current flowing through condenser 248 is alternating current. As soon as the control system is rebalanced, however, the condenser 248 is able to discharge through the windings 212 and 213 and resistors 244 and 245. Thus, one path for the current flowing from condenser 248 is as follows: from the upper plate of condenser 248 through conductor 306, resistor 244, conductors 310, 309, and 308, winding 213, and conductor 307 back to the lower plate of condenser 248. The other path for condenser 248 to discharge through is from the upper plate of condenser 248 through conductor 306, resistor 245, conductors 325, 326, and 327, winding 212, and conductor 307 to the lower plate of condenser 248. The extent and duration of the flow of this direct current will depend upon the resistance values of resistors 244, 245, and of windings 212 and 213 and the capacity of condenser 248. The effect of the flow is to cause a pronounced braking action on the rotor 211. By selecting resistors 244, 245 and condenser 248 of proper size, this braking action can be of sufficient magnitude and sufficiently prolonged to bring the rotor to a stand still quickly.

If the bridge is unbalanced in the opposite direction, the voltages impressed across resistors 275 and 280 in the output circuits of the triodes of tube 252 will be 180° displaced in phase from those previously considered. As a result, the alternating voltages impressed across resistors 277 and 282 and impressed on grids 236 and 241 will similarly be 180° displaced in phase from those considered when the unbalance voltage was in the opposite direction. As a result, the grid 236 will now be positive with respect to the cathode during the conductive half cycle so that tube 230 will be conductive and tube 231 non-conductive. As a result, an energizing circuit will be established to winding 212 independently of condenser 219 as follows: from the lower terminal of secondary 218 through conductors 305 and 306, condenser 248, conductor 307, winding 212, conductors 327, 326, 325, and 330, anode 233, cathode 234, and conductors 312 and 313 to the upper terminal of secondary 218. There will also be established an energizing circuit to winding 213 which includes condenser 219, this circuit being as follows: from the lower terminal of secondary 218 through conductors 305 and 306, condenser 248, conductor 307, winding 213, conductors 308 and 316, condenser 219, conductors 315, 326, 325, and 330, anode 233, cathode 234, and conductors 312 and 313 to the upper terminal of secondary 218.

It is to be noted that in the circuits just traced, the circuit to winding 212 did not include condenser 219, while the circuit to winding 213 did include condenser 219. As a result, the current through winding 213 now leads that through winding 212 so that the rotor rotates in the opposite direction from that previously considered. This direction of rotation is such as to move contact arm 65 to the right so as to tend to rebalance the system.

At the same time, a circuit exists through winding 212 independently of the tube 230 as follows: from the lower terminal of secondary 218 through conductors 305 and 306, condenser 248, conductor 307, winding 212, conductors 327, 326, and 332, condenser 247, conductors 334 and 320, resistor 249, and conductors 322 and 313 to the upper terminal of secondary 218. Current will also be supplied independently of the rectifier to winding 213 through the circuit previously traced and also through condenser 219 as follows: from the lower terminal of secondary 218 through conductors 305 and 306, condenser 248, conductor 307, winding 213, conductors 308 and 316, condenser 219, conductors 315, 326, and 332, condenser 247, conductors 334 and 320, resistance 249, and conductors 322 and 313 to the other terminal of secondary 218. As a result of the circuit just traced, a small amount of corrective alternating current is supplied to the windings 212 and 213 to improve the wave form of the current flowing to the windings. Also, as was the case in connection with the operation previously described, the condenser 248 acts to block the flow of direct current to windings 212 and 213 so as to insure that the current flowing to windings 212 and 213 is primarily alternating current.

As was the case before, the condenser 248 becomes charged when the tube 231 first becomes conductive. As a result, when the tube ceases to be conductive, condenser 248 discharges through windings 212 and 213 by reason of the circuits previously traced. Thus, the condenser acts to produce a flow of direct current through the motor winding to cause braking of the motor.

In the description so far given of Figure 7, no values have been assigned to the various elements. In a typical embodiment, the following values were employed for the various elements. Resistors 60 and 64 of the control bridge were each 750 ohm resistors. Blocking condensers 260 and 261 each had a capacitance of .007 microfarad. One megohm resistors were employed for each half of resistance 259. The tube 252 was a 7F7 type tube. Each of resistors 275 and 280 was a one quarter megohm resistor. Each of resistors 277 and 282 was a one half megohm resistor. The blocking condensers 276 and 281 had a capacitance of 0.02 microfarad. Each of the tubes 230 and 231 was a 2050 type of tube. The winding 218 had a full load voltage of approximately 155 volts. Each of the resistors 244 and 245 had a resistance of 8000 ohms. Resistor 249 was given various values of from 700 to 2100 ohms. Successful operation was obtained in this embodiment when the condensers 246 and 247 were one microfarad condensers. As is noted in connection with the previous species, however, the invention is in no way limited to the use of elements of these particular values.

*Conclusion*

It will be seen that I have provided a new and improved motor control system in which braking is accomplished by the application of direct current to the regular alternating current winding of the motor. It will furthermore be seen that in a number of the species of my invention, the means for applying this direct current also improves the running operation of the motor. It will also be seen that I have provided a motor braking arrangement in which the operation of the braking means is controlled by an electronic tube having voltages applied thereto dependent both upon the extent of unbalance of a controlling network and the speed of the motor.

While I have shown certain specific embodiments of my invention, it is to be understood that this is for purposes of illustration only and that the scope of the invention is to be limited solely by the scope of the appended claims.

I claim as my invention:

1. In a motor control system, an alternating current motor having at least one field winding, means for applying a cyclically varying voltage to said winding to cause operation of said motor, a rectifier of variable conductivity connected in parallel with said winding, and means for rendering said rectifier substantially non-conductive during normal operation of said motor and for increasing the conductivity of said rectifier to increase the unidirectional component of current through said winding and thereby stop movement of said motor.

2. In a motor control system, a split phase motor having at least two field windings, normally balanced control means, means for applying cyclically varying voltages to said windings, the magnitude of the voltage applied to at least one of said windings being dependent upon the extent of unbalance of said control means, a rectifier of variable conductivity connected in parallel with one of said windings, and means for controlling the conductivity of said rectifier in accordance with the unbalance of said control means to change the unidirectional component of current through said winding and thereby provide a braking action which varies directly as said unidirectional component of current.

3. In a motor control system, a split phase motor having at least two field windings, normally balanced control means, a source of alternating power, means for connecting one of said windings to said alternating source of power, means for applying to another of said windings a cyclically varying voltage whose magnitude is dependent upon the extent of unbalance of said control means, a rectifier of variable conductivity connected in parallel with said first named winding, and means for increasing the conductivity of said rectifier to increase the unidirectional component of current through said winding and thereby provide a braking action on said motor as said control means approaches a balanced condition.

4. In a motor control system, a split phase motor having at least two field windings, normally balanced control means, a source of alternating power, means for connecting one of said windings to said alternating source of power, means for applying to another of said windings a cyclically varying voltage whose magnitude is dependent upon the extent of unbalance of said control means, a rectifier of variable conductivity connected in parallel with said last named winding, and means for increasing the conductivity of said rectifier to apply an increasing unidirectional current component to said winding and thereby provide a braking action on said motor as said control means approaches a balanced condition.

5. In a motor control system, a split phase motor having at least two field windings, normally balanced control means, a source of alternating power, means for connecting one of said windings to said alternating source of power, means for applying to another of said windings a cyclically varying voltage whose magnitude is dependent upon the extent of unbalance of said control means, a rectifier of variable conductivity connected in parallel with said last named winding, and means for so controlling the conductivity of the rectifier that the unidirectional component of the current flowing through said last named winding first increases and then decreases to provide a similarly changing braking action on said motor as said control means approaches a balanced condition.

6. In a motor control system, an alternating current motor having at least one field winding, means for supplying a cyclically varying voltage to said winding to cause operation of said motor, an electronic rectifier connected in parallel with said winding, said rectifier comprising a control electrode, and means effective when said motor is being operated normally to maintain said control electrode at a potential at which said rectifier is effectively non-conductive, said rectifier being effective when conductive to increase the unidirectional component of the cyclically varying voltage to produce a braking action on said motor.

7. In a motor control system, an alternating current motor having at least two field windings, normally balanced control means, means for applying to one of said windings a cyclically varying voltage whose magnitude is dependent upon the extent of unbalance of said control means, an electronic rectifier connected in parallel with one of said windings, said rectifier comprising a control electrode, and means effective when said control means is unbalanced to maintain said control electrode at a potential at which said rectifier is effectively non-conductive, said last named means being effective when said control means is balanced to maintain said control electrode at a potential at which said rectifier is conductive, whereby a braking action is applied to said motor as said control means approaches balance.

8. In a motor control system, an alternating current motor having at least two field windings, normally balanced control means for producing an alternating control voltage dependent upon the unbalance of said control means, means for applying to one of said windings a cyclically varying voltage whose phase and magnitude is dependent upon the phase and magnitude of said control voltage, an electronic rectifier connected in parallel with one of said windings, said rectifier comprising a control electrode, means normally maintaining said control electrode at a potential at which said rectifier is conductive, and biasing means associated with said control means, said biasing means comprising a rectifier and being effective to rectify a portion of said control voltage and apply it to said control electrode to render said rectifier non-conductive when said control means is unbalanced, whereby a braking action is effective on said motor which varies with the conductivity of said rectifier.

9. In a motor control system, an alternating current motor having at least two field windings, normally balanced control means, a source of alternating power, means for connecting a first of said windings to said alternating source of power, means for applying to a second of said windings a cyclically varying voltage whose phase and magnitude is dependent upon the direction and extent of unbalance of said control means, an electronic rectifier connected in parallel with said first named winding, said rectifier comprising a control electrode, said electrode assuming a potential when said control means is balanced such that said rectifier is conductive so that there is a substantial unidirectional component in the current flowing through said first named winding, and means effective when said control means is unbalanced to maintain said control electrode at a potential at which said rectifier is effectively non-conductive, whereby a braking action is effective on said motor which varies with the conductivity of said rectifier.

10. In a motor control system, an alternating current motor having at least two field windings, normally balanced control means, a source of alternating power, means for connecting a first of said windings to said alternating source of power, means for applying to a second of said windings a cyclically varying voltage whose phase and magnitude is dependent upon the direction and extent of unbalance of said control means, an electronic rectifier connected in parallel with said last named winding, said rectifier comprising a control electrode, and means effective as said control means is unbalanced to maintain on said control electrode a biasing potential of increasing magnitude so that said rectifier is effectively non-conductive whenever said control means is appreciably unbalanced, the current flowing through said rectifier also decreasing in magnitude immediately adjacent the balance point of said control means due to the decrease in the voltage applied to said last named winding and hence across said rectifier, whereby a braking action is effective on said motor which varies with the current through said rectifier.

11. In motor control apparatus, an alternating current motor having at least one field winding, means including an alternating current source of power and an electronic amplifier connected to said source for applying a cyclically varying voltage to said winding to cause operation of said motor, means adapted to be connected to a source of signal voltage for controlling said amplifier and hence said winding in accordance with the value of said signal voltage, and means for aiding the tendency of the speed of said motor to decrease upon said signal voltage approaching a value calling for termination of motor operation, said last named means comprising a rectifier of variable conductivity connected in parallel with said winding, and means for rendering said rectifier substantially nonconductive when said signal voltage assumes a value calling for motor operation and for increasing the conductivity of said rectifier as said signal voltage approaches said value calling for termination of motor operation.

12. In motor control apparatus: an alternating current motor having two field windings; means connecting one of said windings to a source of power to continuously energize said winding; normally balanced control means; means applying to the second of said windings a cyclically varying voltage whose magnitude is dependent upon the extent of unbalance of said control means to cause rotation of said motor; and speed reducing means comprising an electronic device operatively connected to said motor to affect the speed thereof in accordance with the current flow through said device, said device having a control element for controlling the current flow therethrough and having a first voltage applied to said device dependent upon the unbalance of the control means and a second voltage applied to said device and derived from said second winding, said first voltage being applied to said control element in such a manner that said device is operative only as said control means approaches balance to affect the voltage applied to said second winding in such a manner as to bring the motor to a stop.

13. In motor control apparatus: an alternating current motor having two field windings; means connecting one of said windings to a source of power to continuously energize said winding; normally balanced control means; means applying to the second of said windings a cyclically varying voltage whose magnitude is dependent upon the extent of unbalance of said control means to cause rotation of said motor; and speed reducing means comprising an electronic device operatively connected to said motor to affect the speed thereof in accordance with the current flow through said device, said device having a control element for controlling the current flow therethrough and having a first voltage applied to said device proportional to the unbalance of the control means and a second voltage applied to said device dependent upon the voltage across said second winding, said first voltage being applied to said control element in such a manner that said device is operative only as said control means approaches balance to affect the voltage applied to said last named winding to bring the motor to a stop.

14. In a motor control apparatus; an electric motor; normally balanced control means operative to produce a signal voltage dependent upon the extent of unbalance thereof; means including a multi-stage electronic amplifier having an input circuit connected to said control means and controlling the energization of said motor in accordance with said signal voltage; speed reducing means including a further electronic device electrically connected to said motor for affecting the energization of said motor to reduce the speed thereof, said device having a control element for controlling the conductivity of said device; means for applying to said device a voltage affected by the speed of the motor; and means for also applying to said device a voltage derived from and proportional to the amplitude of that existing at an intermediate portion of said amplifier, said last named voltage being applied to said control element in such a manner that said electronic device is effective to cause a reduction in the speed of the motor only as said signal voltage approaches a predetermined value indicative of the balancing of said normally balanced control means.

WILLIAM J. FIELD.

(References on following page)

REFERENCES CITED

The following references are of record in the file of this patent:

UNITED STATES PATENTS

| Number | Name | Date |
|---|---|---|
| 609,990 | Lamme | Aug. 30, 1898 |
| 1,925,882 | Smith | Sept. 5, 1932 |
| 2,119,205 | Doyle | May 31, 1938 |
| 2,141,056 | Watkins | Dec. 20, 1938 |
| 2,172,064 | Harrison | Sept. 5, 1939 |
| 2,192,022 | Wills | Feb. 27, 1940 |
| 2,222,947 | Harrison | Nov. 26, 1940 |
| 2,304,604 | Schweitzer | Dec. 8, 1942 |
| 2,355,537 | Jones | Aug. 8, 1944 |
| 2,367,746 | Williams | Jan. 23, 1945 |

FOREIGN PATENTS

| Number | Country | Date |
|---|---|---|
| 587,525 | Germany | Nov. 4, 1933 |